(12) United States Patent
Kuwata et al.

(10) Patent No.: US 9,350,215 B2
(45) Date of Patent: May 24, 2016

(54) METHOD AND STRUCTURE FOR MOUNTING SENSOR SUBSTRATE OF BRUSHLESS MOTOR

(71) Applicant: ORIENTAL MOTOR CO., LTD., Tokyo (JP)

(72) Inventors: Shinya Kuwata, Ibaraki (JP); Haruaki Osato, Ibaraki (JP)

(73) Assignee: Oriental Motor Co., Ltd., Tokyo (JP)

( * ) Notice: Subject to any disclaimer, the term of this patent is extended or adjusted under 35 U.S.C. 154(b) by 0 days.

(21) Appl. No.: 14/410,495

(22) PCT Filed: Jun. 12, 2013

(86) PCT No.: PCT/JP2013/066233
§ 371 (c)(1),
(2) Date: Dec. 22, 2014

(87) PCT Pub. No.: WO2014/002767
PCT Pub. Date: Jan. 3, 2014

(65) Prior Publication Data
US 2015/0326097 A1 Nov. 12, 2015

(30) Foreign Application Priority Data
Jun. 29, 2012 (JP) .................. 2012-146995

(51) Int. Cl.
*H02K 29/08* (2006.01)
*H02K 3/38* (2006.01)
(Continued)

(52) U.S. Cl.
CPC ............ *H02K 11/0021* (2013.01); *G01D 5/142* (2013.01); *H02K 29/08* (2013.01); *H02K 3/38* (2013.01)

(58) Field of Classification Search
CPC ........................... H02K 11/0021; G01D 5/08
USPC .................. 310/194, 67 R, 400–417
See application file for complete search history.

(56) References Cited

U.S. PATENT DOCUMENTS

2009/0284088 A1* 11/2009 Takahashi .............. H02K 1/187
310/66
2009/0324435 A1 12/2009 Sears et al.

FOREIGN PATENT DOCUMENTS

EP 1372250 A2 12/2003
EP 2 173 022 A2 4/2010
(Continued)

OTHER PUBLICATIONS

Office Action for Chinese Application No. 201380032024.9 dated May 13, 2015.
(Continued)

*Primary Examiner* — Terrance Kenerly
(74) *Attorney, Agent, or Firm* — Alston & Bird LLP (57) ABSTRACT

A method and a structure are provided for mounting a sensor substrate of a brushless motor. Insulating members are formed on a stator core on which radially arranged pole teeth are provided on an inner peripheral surface side of the stator core with a predetermined space, a stator coil is wound around the pole teeth via the insulating members, stopper walls are provided to the pole teeth of the insulating member on a leading edge thereof, pedestal parts are formed on the stopper walls on an inner periphery surface side thereof, a sensor substrate to which a position detection element which detects the position of a permanent magnet provided to a rotor is arranged on the pedestal parts, locking portions for locking the sensor substrate are provided to some of the pedestal parts, and thereby the coming off of the sensor substrate in an axial direction is prevented.

10 Claims, 5 Drawing Sheets

(51) Int. Cl.
*H02K 11/00* (2016.01)
*G01D 5/14* (2006.01)

(56) References Cited

FOREIGN PATENT DOCUMENTS

| GB | 2 468 382 A | 9/2010 |
|---|---|---|
| JP | S61 121760 A | 6/1986 |
| JP | 63-39448 | 2/1988 |
| JP | H06-245461 | 9/1994 |
| JP | 07-298575 | 11/1995 |
| JP | 09-308208 | 11/1997 |
| JP | 2000-041371 | 2/2000 |
| JP | 2008-54390 | 3/2008 |
| WO | WO 2012/023245 A1 | 2/2012 |

OTHER PUBLICATIONS

Office Action for Korean Application No. 10-2014-7036240 dated Jul. 10, 2015.
Fujitsu General Ltd., Japanese Utility Model Application No. 132378/1987(Laid- open No. 37376/1989) published on Mar. 7, 1989.
International Search Report for PCT Application No. PCT/JP2013/0066233 dated Jul. 2, 2013.
Extended European Search Report from corresponding European Patent Application No. 13810665.3 dated Feb. 5, 2016.

\* cited by examiner

METHOD AND STRUCTURE FOR MOUNTING SENSOR SUBSTRATE OF BRUSHLESS MOTOR

CROSS-REFERENCE TO RELATED APPLICATIONS

This application is a national stage application filed under 35 U.S.C. 371 of International Application No. PCT/JP2013/066233, filed Jun. 12, 2013, which claims priority from Japanese Patent Application No. 2012-146995, filed Jun. 29, 2012, each of which is incorporated by reference herein in its entirety.

BACKGROUND OF THE INVENTION

1. Technical Field

The present invention relates to a method and a structure for mounting a sensor substrate of a brushless motor. More specifically, the present invention relates to a brushless motor provided with a position detection element such as a Hall integrated circuit (IC), and particularly relates to a method and a structure for mounting a printed board, i.e., a sensor substrate, provided with a position detection element to shorten the dimension in the axial direction, on an inner diameter side of a coil end.

2. Background Art

A brushless motor generally includes a rotor provided with a permanent magnet and a rotational position detection element, such as a Hall IC, for detecting magnetic pole positions of the permanent magnet of the rotor, which is provided on the side of a stator. In recent years, it has been more and more highly demanded by the market to reduce the size and the thickness of a motor, and this also applies to a brushless motor. In reducing the thickness of a brushless motor, the position and the method of arrangement of a rotational position detection element such as a Hall IC and the degree of the fixing strength are the important factors. In the inventions of Patent Literatures 1 and 2, a printed board on which a rotation detection element is provided is arranged so that it is mounted on a coil end of stator winding, and accordingly, the rotation detection element may be distant from the permanent magnet of the rotor, which may cause problems in the detection of the magnetic poles. Patent Literatures 1 and 2 attempt to solve the problem by using a permanent magnet and a magnetic portion of the rotor that are long in the axial direction. Patent Literature 3 discloses a method for fixing a printed board. In Patent Literature 3, pins constituted by a thermoplastic material are allowed to pass through holes formed through a printed board, and then the printed board is fixed by thermally deforming the tips of the pins by using a jig.

CITATION LIST

Patent Literature

Patent Literature 1: JP 09 (1997)-308208 A
Patent Literature 2: JP 2000-041371 A
Patent Literature 3: JP 07 (1995)-298575 A

SUMMARY OF INVENTION

Technical Problem

However, in Patent Literatures 1 and 2, because the permanent magnet and the magnetic portion of the rotor that are long in the axial direction are used, there are problems such as the dimension of the motor in the axial direction may be long and that additional material costs of the permanent magnet and the magnetic portion may be required. In addition, in the method of Patent Literature 3 in which the tip of the pins is thermally deformed to fix a printed board, there is a problem such that large space and additional labor and time are required because of new additional processes necessary in the method.

An object of the present invention is to provide a method and a structure for mounting a sensor substrate of a brushless motor, in which a rotation detection element is arranged near a permanent magnet of a rotor and the sensor substrate can be securely mounted with a simple method, and thus, it is not necessary to elongate the dimension of the permanent magnet of the rotor in an axial direction.

Solution to Problem

In order to solve the above-described problem, according to an aspect of the present invention, in a method for mounting a sensor substrate of a brushless motor, an insulating member that insulates a location for winding of a stator coil from an outside is formed on a stator core on which radially arranged pole teeth are provided on an inner peripheral surface side with a predetermined space, the stator coil is wound around the pole teeth via the insulating member, stopper walls that prevent the coming off of the stator coil are provided on a leading edge of the pole teeth of the insulating member, pedestal parts are formed on an inner peripheral surface side of the stopper walls, a sensor substrate, to which a position detection element which detects a position of a permanent magnet provided to a rotor is installed, is arranged on the pedestal parts, and locking portions for locking the sensor substrate are provided to some of the pedestal parts to prevent the coming off of the sensor substrate in a radial direction.

In addition, according to an aspect of the present invention, in a method for mounting a sensor substrate of a brushless motor, stator covers constituted by insulating members are formed on both sides of a stator core on which radially arranged pole teeth are provided on an inner peripheral surface side with a predetermined space, the stator coil is wound around the pole teeth via the stator covers, stopper walls that prevent the coming off of the stator coil are provided on a leading edge of the pole teeth of the stator covers, pedestal parts are formed on an inner peripheral surface side of the stopper walls, a sensor substrate, to which a position detection sensor which detects a position of a permanent magnet provided to a rotor is installed, is arranged on the pedestal parts, and locking portions for locking the sensor substrate are provided to some of the pedestal parts to prevent the coming off of the sensor substrate in a radial direction.

Furthermore, according to an aspect of the present invention, in the method for mounting the sensor substrate of the brushless motor, the locking portions are provided at locations distant from the stopper wall by a predetermined space, and holding members that regulate moving of the locking portions in a radial direction by holding the locking portions on a back surface thereof are provided in a gap between the locking portions and the stopper walls to prevent the coming off of the sensor substrate from the locking portion.

Furthermore, according to an aspect of the present invention, in the method for mounting the sensor substrate of the brushless motor, moving of the locking portion is regulated by using an inner diameter side cylindrical portion of coil end covers that are provided in a gap between the locking portion and the stopper wall and cover the stator coil.

In addition, according to another aspect of the present invention, a structure for mounting a sensor substrate of a brushless motor includes a brushless motor including a rotor arranged concentrically on an axis of a stator and a position detection element which detects a position of a permanent magnet provided to the rotor, and in the structure, pole teeth are provided to a stator core of the stator radially on an inner peripheral surface side along a circumferential direction with a predetermined space, an insulating member for insulating a location for winding of the stator coil from an outside is formed on each of the pole teeth on a surface thereof except at least an inner surface, stopper walls that axially protrude from a leading edge of a cover portion of the pole tooth of the insulating member are provided to prevent the coming off of the stator coil wound around the cover portion of the pole teeth, pedestal parts are formed that extend from an inner surface side of the stopper wall toward a central axis, a sensor substrate to which a position detection element is mounted so as to face the permanent magnet provided to the rotor in an axial direction is arranged on the pedestal parts, and locking portions that prevent the coming off of the sensor substrate in the axial direction are provided on the pedestal parts.

Furthermore, according to yet another aspect of the present invention, a structure for mounting a sensor substrate of a brushless motor includes a brushless motor including a rotor arranged concentrically on an axis of a stator and a position detection element which detects a position of a permanent magnet provided to the rotor, and in the structure, pole teeth are provided to a stator core of the stator radially on an inner peripheral surface side along a circumferential direction with a predetermined space, stator covers for insulating a location for winding of the stator coil from an outside is formed on both ends of each of the pole teeth on a surface thereof except at least an inner surface, stopper walls that axially protrude from a leading edge of a cover portion of the pole tooth of the stator cover are provided to prevent the coming off of the stator coil wound around the cover portion of the pole tooth, pedestal parts are formed that extend from an inner surface side of the stopper wall toward a central axis, a sensor substrate to which a position detection element is mounted so as to face the permanent magnet provided to the rotor in an axial direction is arranged on the pedestal parts, and locking portions that prevent the coming off of the sensor substrate in the axial direction are provided on the pedestal parts.

Furthermore, according to yet another aspect of the present invention, in the structure for mounting the sensor substrate of the brushless motor, positioning pins are provided so as to protrude from the pedestal parts in the axial direction, recessed portions with which the positioning pins are engaged are provided to the sensor substrate, claw portions that protrude from the pedestal parts in the axial direction are provided as the locking portions, the claw portions engaging with the sensor substrate, and a holding member for preventing disengagement of the claw portion is arranged at the back of the claw portion.

In addition, according to yet another aspect of the present invention, the holding member is disposed in a gap portion formed between the claw portion and the stopper wall.

Furthermore, according to yet another aspect of the present invention, coil end covers that cover the stator coil of the stator on both ends thereof are provided, and an inner diameter side cylindrical portion of the coil end covers is inserted into the gap portion as the holding member.

Advantageous Effects of Invention

According to the present invention, because a detection element such as a Hall IC is arranged near a permanent magnet of a rotor, and thus, the sensor substrate can be securely mounted, it is not necessary to elongate the dimension of the magnet of the rotor in an axial direction or to provide a magnet for a sensor, and thus the length of the motor in the axial direction can be shortened, and thereby a thin brushless motor can be provided.

DESCRIPTION OF EMBODIMENTS

Embodiments of the present invention will be described in detail below with reference to FIGS. 1 to 7.

Figure 1:
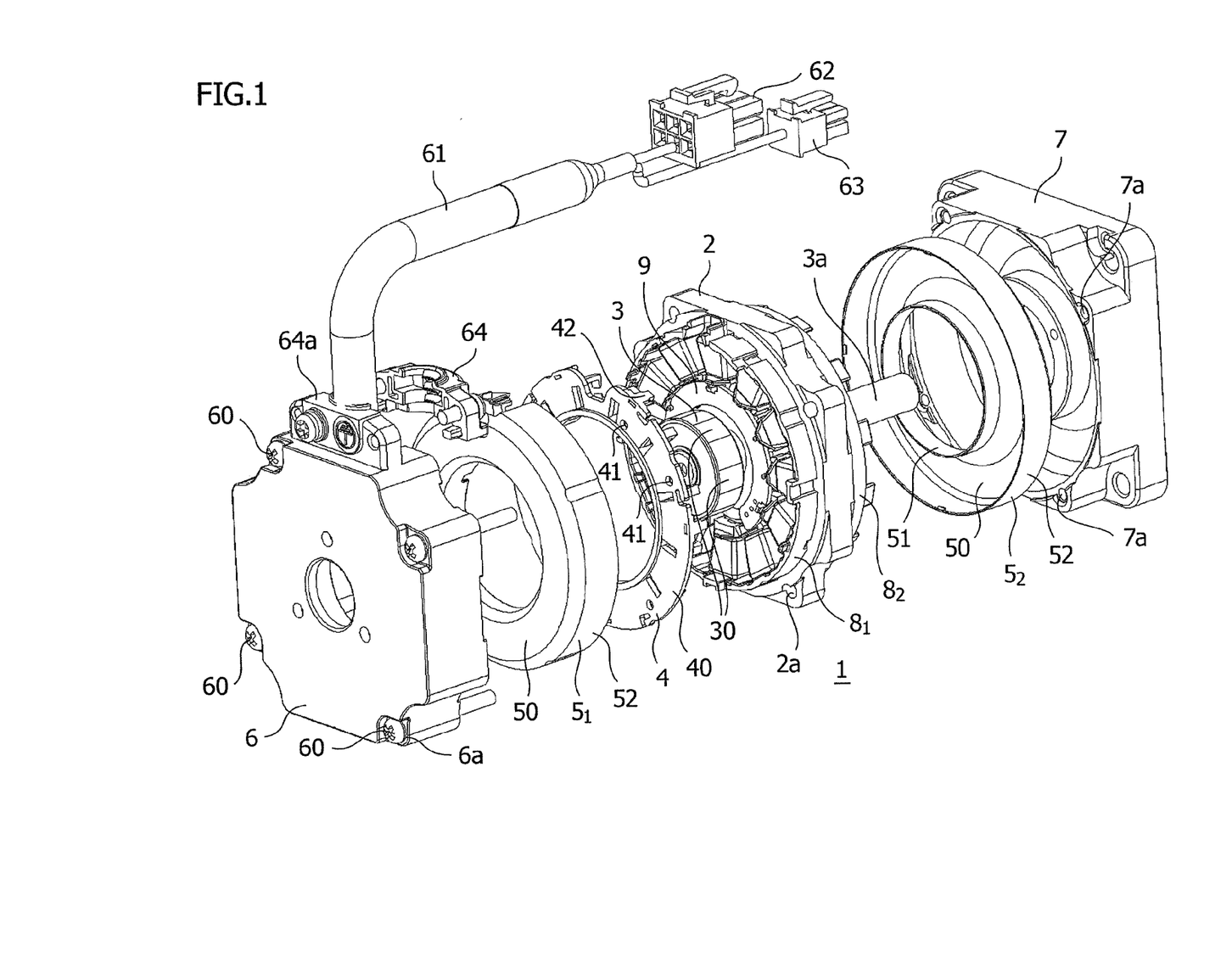
FIG. 1 is an exploded view of a brushless motor implemented by the present invention.

Referring to FIG. 1, which is an exploded view of a brushless motor, a brushless motor 1 is constituted by a stator 2, a rotor 3 arranged on an axis of the stator 2, a lead clamping plate 4 assembled on one side of the stator 2, a pair of coil end covers $5_1$, $5_2$ assembled on both sides of the stator 2, and a bracket 6 and a flange 7 that are assembled on the further outside of the coil end covers $5_1$, $5_2$, and these components are integrally assembled. A motor case of the brushless motor 1 is constituted by the bracket 6, the flange 7, and an outer surface of the stator 2.

Figure 2:
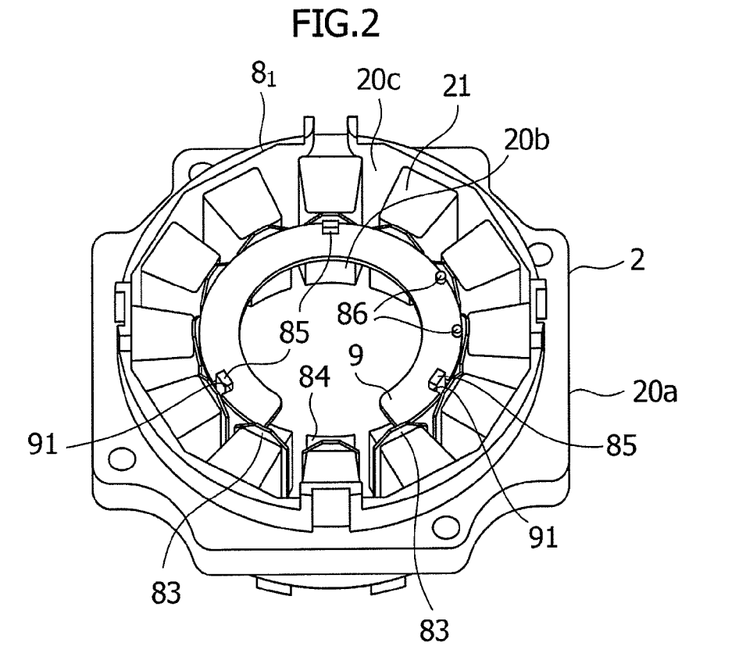
FIG. 2 is a view which illustrates a state in which a sensor substrate is mounted onto a stator cover according to the method and the structure for mounting the sensor substrate of the present invention.

Referring to FIG. 2, the stator 2 of the brushless motor 1 includes pole teeth 20b formed at an inside of a yoke 20a formed on the periphery of the pole teeth 20 and including thin punched steel plates having been produced by pressing steel plates such as silicon steel plates and laminated together, a stator core 20 including a slot 20c formed between the pole teeth 20, a pair of stator covers (also referred to as "insulators") $8_1$, $8_2$ that are assembled from both sides of the stator core 20 and insulate the inner surface side of the yoke 20a from the periphery of the pole teeth 20 except the inner surface thereof, and a stator coil 21 wound around the pole teeth 20 of the stator covers $8_1$, $8_2$.

The rotor 3 is concentrically arranged on the axis of the stator 2, and permanent magnets 30 are provided on a peripheral surface of the rotor 3 with a predetermined space.

Figure 6:
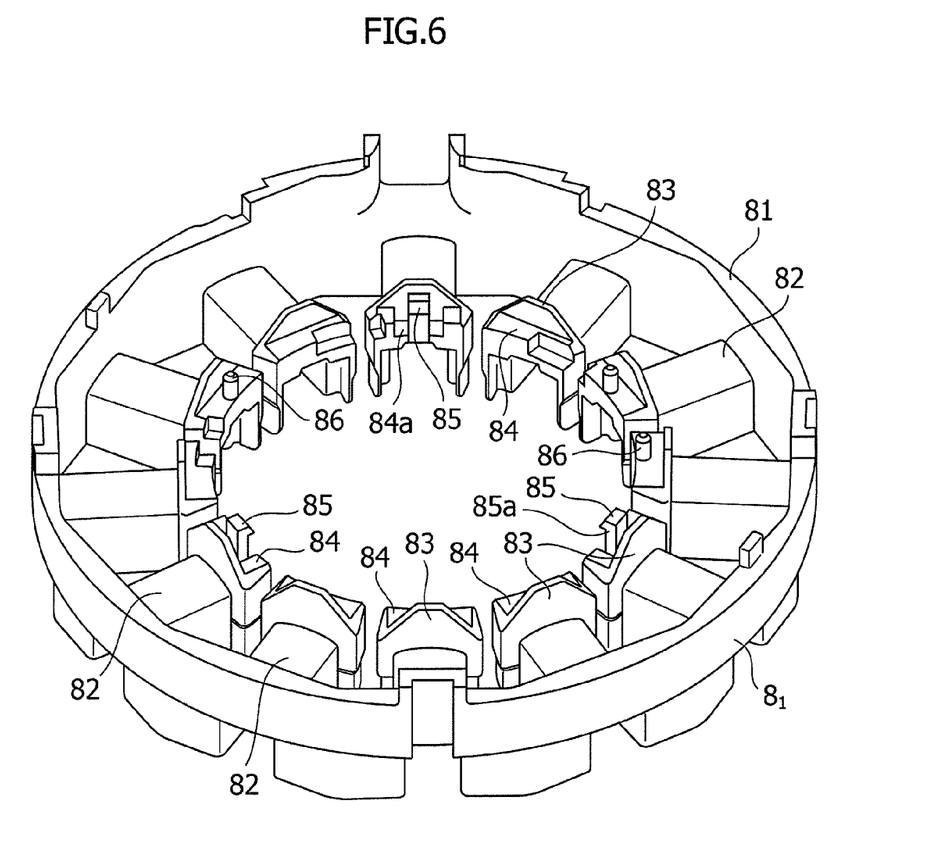
FIG. 6 is a perspective view illustrating the stator cover.

FIG. 6 illustrates the stator cover 81. The stator cover 81 is an insulating member prepared by using a resin material molded by injection molding, for example. Pole tooth cover portions 82 having an inverted U-shaped cross section are radially extended on the inner surface of the ring-shaped ring portion 81 in the circumferential direction with a predetermined space. The pair of stator covers $8_1$, $8_2$ is assembled from above and below so as to sandwich and cover the stator 2 on both sides thereof and particularly insulates the periphery of the pole teeth 20b and the inside of the yoke 20a from the outside. The stator coil 21 is wound by a coil winding machine around the outside of the pole tooth cover portion 82, which covers the periphery of the pole teeth 20b. A trapezoidal stopper wall 83 is protruded from the inner diameter side of the pole tooth cover portion 82 of at least one stator cover 81 toward the outside in the axial direction to prevent the coming off of the stator coil 21. Pedestal parts 84 that are extensions from the pole tooth cover portion 82 toward the central axis are formed on the inner surface side of the stopper wall 83 provided on the pole tooth cover portion 82. The pedestal parts 84 provided on the upper portion of the stopper walls 83 of the pole tooth cover portions 82 form a substantially ring-shaped pedestal part as a whole, and an arc-shaped sensor substrate 9 is mounted on the pedestal parts 84.

Figure 4:
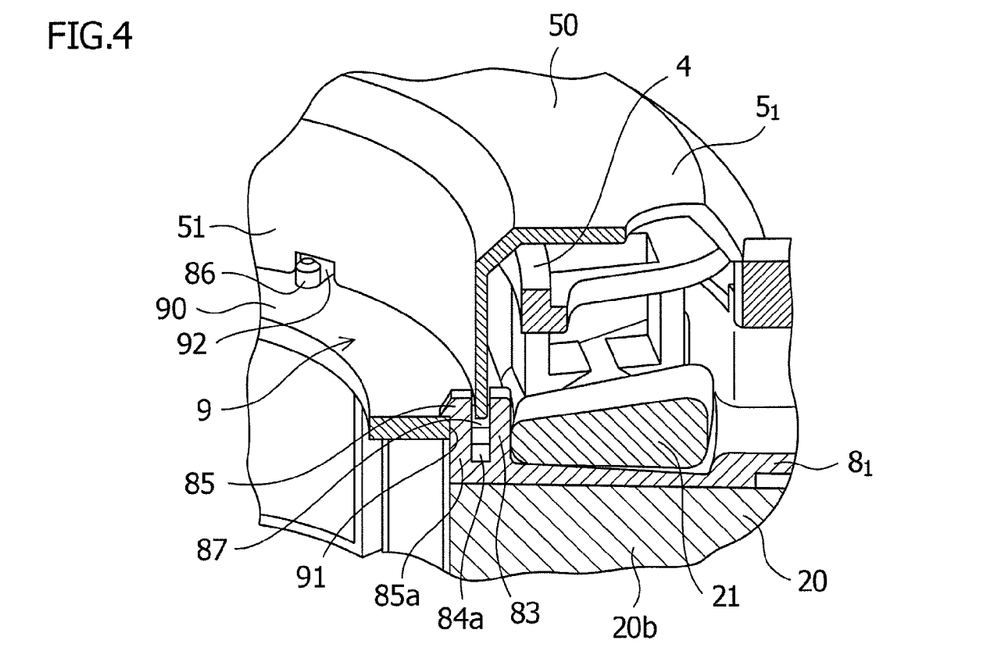
FIG. 4 is a cross section taken along A-A in FIG. 3 that illustrates a state of assembly of a claw portion of the stator cover and the coil end covers.

Referring to FIGS. 2 and 4, the sensor substrate 9 includes a substantially ring-shaped printed board 90 to which a rotational position detection element such as a Hall IC is assembled separately from other electronic parts for controlling the motor. On the printed board 90, a predetermined number of cutouts 91 are formed in outer periphery portions and plural positioning recessed portions 92 are formed at predetermined locations on the periphery of the board surface.

Figure 3:
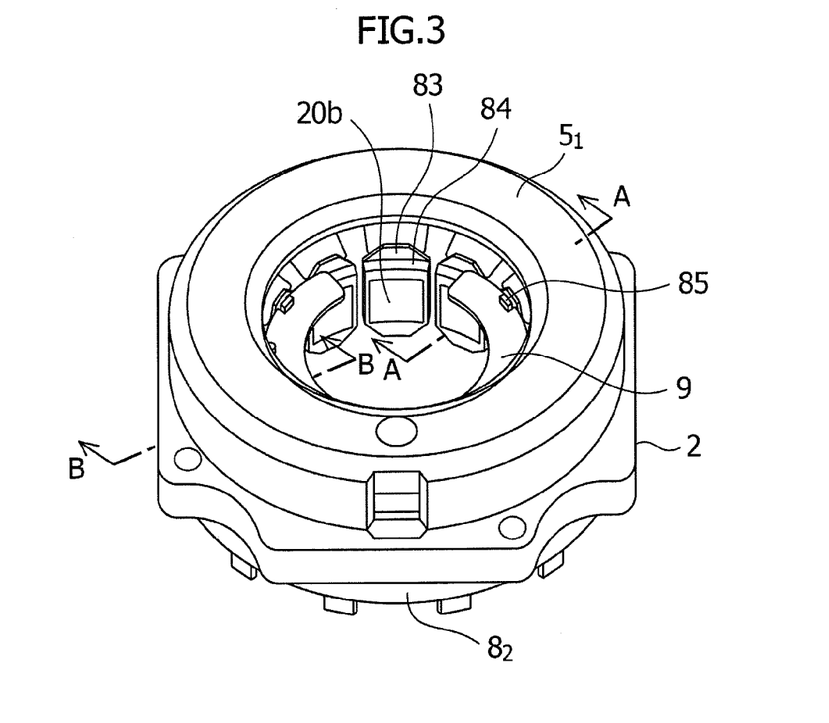
FIG. 3 is a view which illustrates a state in which coil end covers are mounted according to the method and the structure for mounting the sensor substrate of the present invention.
Figure 5:
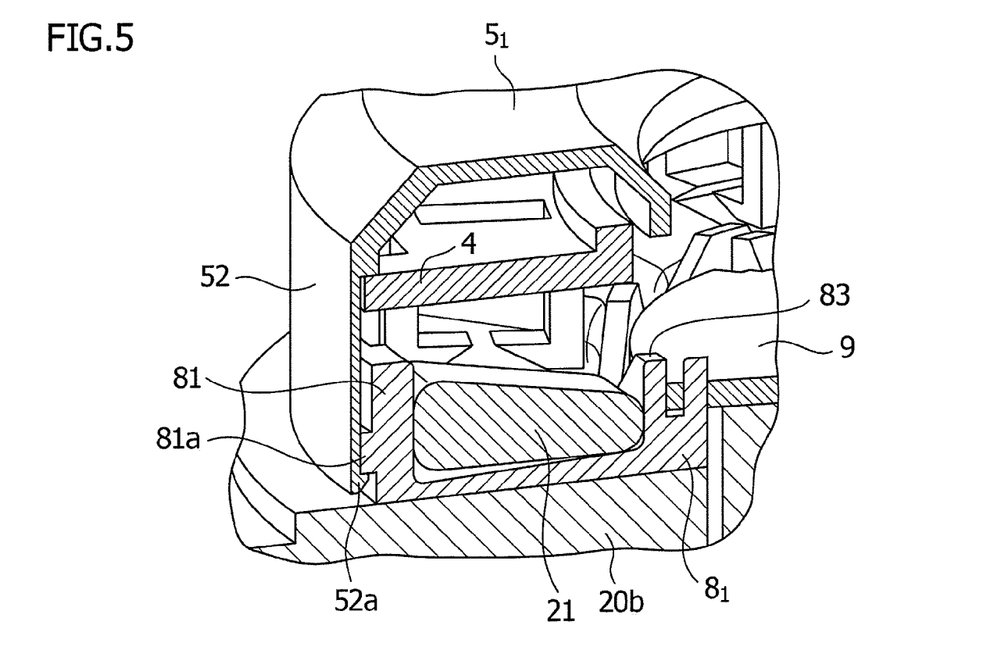
FIG. 5 is a cross section taken along B-B in FIG. 3.
Figure 7:
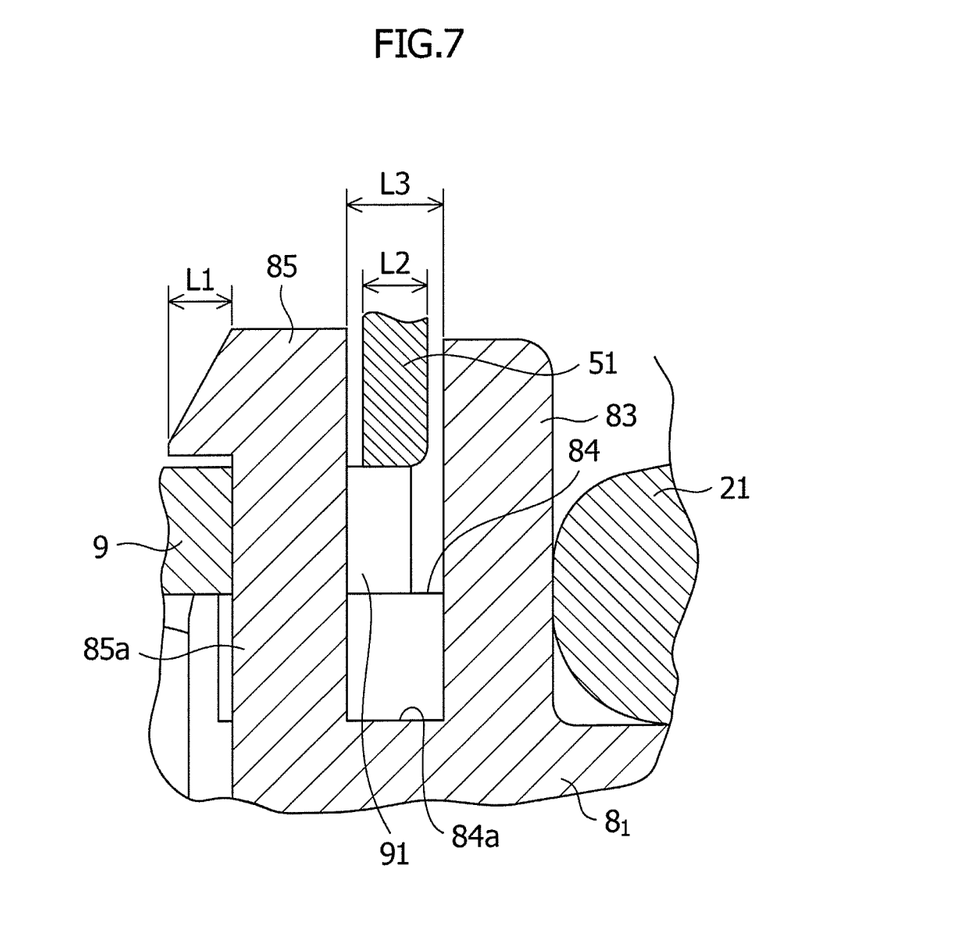
FIG. 7 is a partial cross section illustrating a relationship between a gap portion of the stator cover and the thickness of the coil end cover.

Referring to FIGS. 6 and 7, claw portions 85 and pins (one or more pins, for example) 86 are protruded in the axial direction from some of the pedestal parts 84, i.e., from three or more pedestal parts 84, as locking portions. The sensor substrate 9 is positioned and fixed in the circumferential direction by preventing the coming off of the stator coil 21 by allowing the claw portions 85 to engage with the cutouts 91 and allowing the pins 86 to engage with the positioning recessed portion 92. On each of the pedestal parts 84 on which the claw portion 85 is provided, a step portion 84a that is formed lower by one step is provided, and the claw portion 85 is erected on the step portion 84a to secure the sufficient length of an axial portion 85a of the claw portion 85. A predetermined gap portion 87 is provided between the claw portion 85 and the stopper wall 83, and an inner cylindrical portion 51 of at least one of the coil end cover 51 is assembled to the gap portion 87. Referring to FIGS. 3 to 5, in the coil end covers $5_1$, $5_2$, the inner cylindrical portion 51 is provided on an inner periphery side of a ring-shaped lid portion 50 and an outer cylindrical portion 52 is provided on an outer periphery side of the ring-shaped lid portion 50. In the outer cylindrical portion 52, a claw portion 52a provided on the inside of the leading edge of the outer cylindrical portion 52 is assembled to a protrusion 81a provided on an outer surface of a ring 81 of the stator covers $8_1$, $8_2$ to assemble the coil end covers $5_1$, $5_2$ to the stator covers $8_1$, $8_2$.

On the lead clamping plate 4, multiple lead outlet holes 41 are formed on a ring-shaped plate 40. Leads are drawn out through the lead outlet holes 41 for connection. The lead clamping plate 4 is assembled to at least one of the stator covers (i.e., the stator cover 81) via claw portions 42 provided on the periphery of the plate 40.

Bolt holes 6a, 7a are formed at the four corners of the bracket 6 and the flange 7 provided on the outer ends of the brushless motor 1, and the bracket 6 and the flange 7 are integrally fastened together with bolts 60 threaded through the bolt holes 6a, 7a. In addition, the bolts 60 are threaded through bolt holes 2a provided at four corners of the stator 2 to co-fasten the stator 2 between the bracket 6 and the flange 7.

The bracket 6 and the flange 7 respectively include built-in bearings (not illustrated) provided in through holes for inserting an output axis 3a of the rotor 3 to rotatably support the output axis 3a of the rotor 3.

External cables 61 including a bundle of power cables and signal cables are drawn out from the bracket 6 for connection with units such as a control unit. Connectors 62, 63 are connectors for connection with the control unit and the like.

A cable clamp 64 is assembled to a half clamping portion 64a formed integrally with the bracket 6 and retains the external cable 61.

A method for mounting the above-described sensor substrate will be described. The sensor substrate 9 is assembled to the pedestal parts 84 provided on one of the stator covers $8_1$, $8_2$ assembled to the stator core 20. In assembling the sensor substrate 9, the pins 86 are aligned with the positioning recessed portions 92 of the sensor substrate 9, then the claw portions 85 as the locking portions are allowed to engage with the cutouts 91, and then the sensor substrate 9 is pressed in. The pins 86 are inserted into the positioning recessed portions 92 in the above-described manner to position the sensor substrate 9, and the claw portions 85 are allowed to engage with the cutouts 91 due to the resilient force of the claw portions, and thus the sensor substrate 9 is fixed. Next, the coil end covers $5_1$, $5_2$ are assembled onto the stator covers $8_1$, $8_2$, the claw portion 52a of the outer cylindrical portion 52 on the leading edge thereof is allowed to engage with the protrusion 81a on the outer surface of the ring-shaped portion 81 of the stator covers $8_1$, $8_2$ to assemble the coil end covers $5_1$, $5_2$ to the stator covers $8_1$, $8_2$. In this structure, one of the coil end covers $5_1$, $5_2$, i.e., the inner cylindrical portion 51, is arranged in the gap portion 87 between the claw portion 85 and the stopper wall 83 as a holding member to hold the claw portion 85 on the back surface thereof, and thereby the coming off of the claw portion 85 from the cutout 91 of the sensor substrate 9, which may result from deviation in the radial direction, is regulated. Referring to FIG. 7, a width L1 of the claw portion 85 and a thickness L2 of the inner cylindrical portion 51 are set so that the sum of the width L1 and the thickness L2 becomes greater than a width L3 of the gap portion 87, and thereby the coming off of the claw portion 85 is prevented. As described above, the sensor substrate 9 can be held by the claw portions 85 at a set position, and thereby the coming off of the sensor substrate 9 from the pedestal parts 84 can be prevented.

Note that the present invention is not limited to the above-described embodiment, and an insulating structure equivalent to the stator covers $8_1$, $8_2$ can also be formed by using a stator core 20 integrally molded by resin molding instead of using the pair of stator covers $8_1$, $8_2$ which insulates the periphery of the pole teeth 20 formed in the inside of the yoke 20a assembled to the stator core 20 from both sides thereof.

In addition, the numbers of the positioning recessed portions 92 and the cutouts 91 provided on the sensor substrate 9 can be freely set as necessary, and the numbers of the claw portions 85 and the pins 86 provided on the stator covers $8_1$, $8_2$ can be freely set so that they comply with the structure of the sensor substrate 9. In addition, holes simply bored at the surface of the substrate can be used for the positioning recessed portions 92. Furthermore, the inner cylindrical portion 51 of the coil end covers $5_1$, $5_2$ is not always necessary and a member different from the inner cylindrical portion 51 capable of preventing the coming off of the claw portions 85 can be used. As described above, the present invention can of course be implemented by an appropriate alteration or modification thereof within the scope of the present invention so as not to change the gist of the invention.

The invention claimed is:
1. A method for mounting a sensor substrate of a brushless motor, wherein an insulating member which insulates a location for winding of a stator coil from an outside is formed on a stator core on which radially arranged pole teeth are provided on an inner peripheral surface side with a predetermined space, wherein the stator coil is wound around the pole teeth via the insulating member, wherein stopper walls that prevent the coming off of the stator coil are provided on a leading edge of the pole teeth of the insulating member, wherein pedestal parts are formed on an inner peripheral surface side of the stopper walls, wherein a sensor substrate, to which a position detection element which detects a position of a permanent magnet provided to a rotor is installed, is arranged on the pedestal parts, wherein locking portions for locking the sensor substrate are provided to some of the pedestal parts to prevent the coming off of the sensor substrate in a radial direction, wherein the locking portions are provided at locations distant from the stopper wall by a predetermined space, and wherein holding members that regulate moving of the locking portions in a radial direction by holding the locking portions on a back surface thereof are provided in a gap between the locking portions and the stopper walls to prevent the coming off of the sensor substrate from the locking portion.

2. The method for mounting a sensor substrate of a brushless motor according to claim 1, wherein moving of the locking portion is regulated by using an inner diameter side cylindrical portion of coil end covers that are provided in a gap between the locking portion and the stopper wall and cover the stator coil.

3. A method for mounting a sensor substrate of a brushless motor, wherein stator covers constituted by insulating members are formed on both sides of a stator core on which radially arranged pole teeth are provided on an inner peripheral surface side with a predetermined space, wherein the stator coil is wound around the pole teeth via the stator covers, wherein stopper walls that prevent the coming off of the stator coil are provided on a leading edge of the pole teeth of the stator covers, wherein pedestal parts are formed on an inner peripheral surface side of the stopper walls, wherein a sensor substrate, to which a position detection sensor which detects a position of a permanent magnet provided to a rotor is installed, is arranged on the pedestal parts, wherein locking portions for locking the sensor substrate are provided to some of the pedestal parts to prevent the coming off of the sensor substrate in a radial direction, wherein the locking portions are provided at locations distant from the stopper wall by a predetermined space, and wherein holding members that regulate moving of the locking portions in a radial direction by holding the locking portions on a back surface thereof are provided in a gap between the locking portions and the stopper walls to prevent the coming off of the sensor substrate from the locking portion.

4. The method for mounting a sensor substrate of a brushless motor according to claim 3, wherein moving of the locking portion is regulated by using an inner diameter side cylindrical portion of coil end covers that are provided in a gap between the locking portion and the stopper wall and cover the stator coil.

5. A structure for mounting a sensor substrate of a brushless motor comprising:
    a brushless motor including a rotor arranged concentrically on an axis of a stator and a position detection element which detects a position of a permanent magnet provided to the rotor,
    wherein pole teeth are provided to a stator core of the stator radially on an inner peripheral surface side along a circumferential direction with a predetermined space,
    wherein an insulating member for insulating a location for winding of the stator coil from an outside is formed on each of the pole teeth on a surface thereof except at least an inner surface,
    wherein stopper walls that axially protrude from a leading edge of a cover portion of the pole tooth of the insulating member are provided to prevent the coming off of the stator coil wound around the cover portion of the pole teeth,
    wherein pedestal parts are formed that extend from an inner surface side of the stopper wall toward a central axis,
    wherein a sensor substrate to which a position detection element is mounted so as to face the permanent magnet provided to the rotor in an axial direction is arranged on the pedestal parts,
    wherein locking portions that prevent the coming off of the sensor substrate in the axial direction are provided on the pedestal parts,
    wherein positioning pins are provided so as to protrude from the pedestal parts in the axial direction,
    wherein recessed portions with which the positioning pins are engaged are provided to the sensor substrate,
    wherein claw portions that protrude from the pedestal parts in the axial direction are provided as the locking portions, the claw portions engaging with the sensor substrate, and
    wherein a holding member for preventing disengagement of the claw portion is arranged at the back of the claw portion.

6. The structure for mounting the sensor substrate of the brushless motor according to claim 5,
    wherein a plurality of cutouts are formed on a periphery of the sensor substrate with a predetermined space,
    wherein the claw portions engage with the cutouts, and
    wherein the holding member is disposed in a gap portion formed between the claw portion and the stopper wall.

7. The structure for mounting the sensor substrate of the brushless motor according to claim 6,
    wherein coil end covers that cover the stator coil of the stator on both ends thereof are provided, and
    wherein an inner diameter side cylindrical portion of the coil end covers is inserted into the gap portion as the holding member.

8. A structure for mounting a sensor substrate of a brushless motor comprising:
    a brushless motor including a rotor arranged concentrically on an axis of a stator and a position detection element which detects a position of a permanent magnet provided to the rotor,
    wherein pole teeth are provided to a stator core of the stator radially on an inner peripheral surface side along a circumferential direction with a predetermined space,
    wherein stator covers for insulating a location for winding of the stator coil from an outside is formed on both ends of each of the pole teeth on a surface thereof except at least an inner surface,
    wherein stopper walls that axially protrude from a leading edge of a cover portion of the pole tooth of the stator cover are provided to prevent the coming off of the stator coil wound around the cover portion of the pole tooth, wherein pedestal parts are formed that extend from an inner surface side of the stopper wall toward a central axis, wherein a sensor substrate to which a position detection element is mounted so as to face the permanent magnet provided to the rotor in an axial direction is arranged on the pedestal parts, wherein locking portions that prevent the coming off of the sensor substrate in the axial direction are provided on the pedestal parts, wherein positioning pins are provided so as to protrude from the pedestal parts in the axial direction, wherein recessed portions with which the positioning pins are engaged are provided to the sensor substrate, wherein claw portions that protrude from the pedestal parts in the axial direction are provided as the locking portions, the claw portions engaging with the sensor substrate, and wherein a holding member for preventing disengagement of the claw portion is arranged at the back of the claw portion.

9. The structure for mounting the sensor substrate of the brushless motor according to claim 8, wherein a plurality of cutouts are formed on a periphery of the sensor substrate with a predetermined space, wherein the claw portions engage with the cutouts, and wherein the holding member is disposed in a gap portion formed between the claw portion and the stopper wall.

10. The structure for mounting the sensor substrate of the brushless motor according to claim 9, wherein coil end covers that cover the stator coil of the stator on both ends thereof are provided, and wherein an inner diameter side cylindrical portion of the coil end covers is inserted into the gap portion as the holding member.

\* \* \* \* \*